US008964758B2

(12) United States Patent
Lu et al.

(10) Patent No.: US 8,964,758 B2
(45) Date of Patent: Feb. 24, 2015

(54) OSPF NONSTOP ROUTING (NSR) SYNCHRONIZATION REDUCTION

(75) Inventors: Wenhu Lu, San Jose, CA (US);
Ing-Wher Chen, San Jose, CA (US);
Alfred C. Lindem, III, Cary, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 644 days.

(21) Appl. No.: 13/349,392

(22) Filed: Jan. 12, 2012

(65) Prior Publication Data

US 2013/0083801 A1   Apr. 4, 2013

Related U.S. Application Data

(60) Provisional application No. 61/541,072, filed on Sep. 29, 2011.

(51) Int. Cl.
*H04L 12/28* (2006.01)
*H04L 12/56* (2006.01)
*H04J 1/16* (2006.01)
*H04J 3/14* (2006.01)
(Continued)

(52) U.S. Cl.
CPC ............... *H04L 45/28* (2013.01); *H04L 45/58* (2013.01); *H04L 45/22* (2013.01); *H04L 45/60* (2013.01)
USPC ........................ 370/395.31; 370/219; 370/401

(58) Field of Classification Search
CPC ..... H04L 41/0803; H04L 45/28; H04L 45/02; H04L 45/04; H04L 45/22; H04L 445/58; H04L 45/60; H04J 2203/006; H04Q 2011/0081
USPC ............ 370/219, 220, 324, 395.31, 400, 401, 370/503; 709/242, 248
See application file for complete search history.

(56) References Cited

U.S. PATENT DOCUMENTS 6,856,627 B2   2/2005   Saleh et al.
6,950,427 B1   9/2005   Zinin
(Continued)

FOREIGN PATENT DOCUMENTS

EP   1365551   11/2003

OTHER PUBLICATIONS

Final Office Action, U.S. Appl. No. 13/310,653, dated Sep. 25, 2013, 34 pages.
(Continued)

*Primary Examiner* — Hoang-Chuong Vu
(74) *Attorney, Agent, or Firm* — Blackely, Sokoloff, Taylor & Zafman, LLP

(57) ABSTRACT

A network element is configured to reduce the synchronization costs for implementing Open Shortest Path First (OSPF) Nonstop routing (NSR). The reduced synchronization costs are achieved by reducing the number of acknowledgement messages that are needed to be sent though reliable inter-process communication (IPC) between the active OSPF instance and the standby OSPF instance. The number of acknowledgement messages is reduced by tracking the link state advertisements (LSAs) that have been sent by the active OSPF instance to the standby OSPF instance and by the standby OSPF replying with an acknowledgement of only the last LSA in a group of LSAs received from the active OSPF instance, where the group can have a variety of boundaries such as a group of LSAs in an IPC message. This avoids having a significant number of acknowledgement messages sent through the IPC.

12 Claims, 5 Drawing Sheets

(51) Int. Cl.
*H04L 12/703* (2013.01)
*H04L 12/775* (2013.01)
*H04L 12/773* (2013.01)
*H04L 12/707* (2013.01)

(56) References Cited

U.S. PATENT DOCUMENTS

| | | | |
|---|---|---|---|
| 6,980,537 B1 | 12/2005 | Liu | |
| 6,985,959 B1 * | 1/2006 | Lee | 709/238 |
| 7,065,059 B1 | 6/2006 | Zinin et al. | |
| 7,095,747 B2 | 8/2006 | Sarmiento et al. | |
| 7,117,241 B2 | 10/2006 | Bloch et al. | |
| 7,248,579 B1 | 7/2007 | Friedman | |
| 7,292,535 B2 | 11/2007 | Folkes et al. | |
| 7,363,387 B1 | 4/2008 | Chandra et al. | |
| 7,391,730 B1 | 6/2008 | Chandra et al. | |
| 7,573,811 B2 | 8/2009 | Koppol | |
| 7,639,680 B1 | 12/2009 | Roy et al. | |
| 7,787,364 B2 | 8/2010 | Maeda et al. | |
| 7,804,770 B2 | 9/2010 | Ng | |
| 7,940,650 B1 | 5/2011 | Sandhir et al. | |
| 7,957,377 B1 * | 6/2011 | Roy | 370/392 |
| 8,199,646 B1 | 6/2012 | Cain | |
| 8,428,003 B1 | 4/2013 | Chen et al. | |
| 2001/0033548 A1 * | 10/2001 | Saleh et al. | 370/218 |
| 2002/0191616 A1 | 12/2002 | Sarmiento et al. | |
| 2002/0196794 A1 | 12/2002 | Bloch et al. | |
| 2003/0056138 A1 * | 3/2003 | Ren | 714/4 |
| 2003/0218982 A1 * | 11/2003 | Folkes et al. | 370/238 |
| 2004/0042395 A1 | 3/2004 | Lu et al. | |
| 2004/0136371 A1 | 7/2004 | Muralidhar et al. | |
| 2005/0105524 A1 | 5/2005 | Stevens et al. | |
| 2005/0265260 A1 | 12/2005 | Zinin et al. | |
| 2005/0265346 A1 | 12/2005 | Ho et al. | |
| 2006/0215547 A1 * | 9/2006 | Koppol | 370/220 |
| 2007/0245034 A1 | 10/2007 | Retana et al. | |
| 2008/0056294 A1 | 3/2008 | Maeda et al. | |
| 2009/0086622 A1 * | 4/2009 | Ng | 370/219 |
| 2009/0116514 A1 | 5/2009 | Yan et al. | |
| 2009/0129398 A1 | 5/2009 | Riegel et al. | |
| 2009/0279536 A1 | 11/2009 | Unbehagen et al. | |
| 2009/0288098 A1 | 11/2009 | Abd-El-Malek et al. | |
| 2010/0054153 A1 | 3/2010 | White et al. | |
| 2010/0254262 A1 | 10/2010 | Kantawala et al. | |
| 2011/0022728 A1 * | 1/2011 | Kern et al. | 709/242 |
| 2011/0026460 A1 | 2/2011 | Lafuente Alvarez et al. | |
| 2011/0231578 A1 | 9/2011 | Nagappan et al. | |
| 2013/0070604 A1 | 3/2013 | Lu et al. | |
| 2013/0070637 A1 | 3/2013 | Lindem et al. | |
| 2013/0073741 A1 | 3/2013 | Lindem et al. | |
| 2013/0083802 A1 | 4/2013 | Chen et al. | |

OTHER PUBLICATIONS

Final Office Action, U.S. Appl. No. 13/310,656, dated Oct. 25, 2013, 29 pages.
Final Office Action, U.S. Appl. No. 13/349,530, dated Dec. 11, 2013, 16 pages.
Notice of Allowance, U.S. Appl. No. 13/310,653, dated Dec. 19, 2013, 38 pages.
Final Office Action, U.S. Appl. No. 13/345,508, dated Jan. 30, 2014, 35 pages.
The European Search Report dated Jan. 7, 2013 from the European Patent Application No. 12184028.4, pp. 1-6.
European Search Report for EP Application No. 12184033.4 mailed Sep. 30, 2013. 5 pages.
Notice of Allowance, U.S. Appl. No. 13/349,530, dated Apr. 14, 2014, 12 pages.
Non-Final Office Action, U.S. Appl. No. 13/350,234, dated Apr. 25, 2014, 21 pages.
Tsai, Chia-Tai , et al., "Implementation of Highly Available OSPF Router on ATCA", 2007, pp. 147-154, *13th IEEE International Symposium on Pacific Rim Dependable Computing, IEEE Computer Society*, Washington, DC, USA.
*OSPF NSR, Cisco Systems Inc.*, Jun. 10, 2011, 6 pages.
Moy, J. , *OSPF Version 2, Network Working Group*, Request for Comments: 2328, Apr. 1998, 245 pages.
Non-Final Office Action, U.S. Appl. No. 13/345,508, dated Jul. 16, 2013, 31 pages.
Non-Final Office Action, U.S. Appl. No. 13/349,530, dated Jul. 15, 2013, 12 pages.
Non-Final Office Action U.S. Appl. No. 13/310,656, dated Jul 9, 2013, 23 pages.
Non-Final Office Action, U.S. Appl. No. 13/310,653, dated May 13, 2013, 31 pages.

* cited by examiner

OSPF NONSTOP ROUTING (NSR) SYNCHRONIZATION REDUCTION

CROSS-REFERENCE TO RELATED APPLICATION

The present application claims priority from U.S. Provisional Patent Application No. 61/541,072, filed on Sep. 29, 2011.

FIELD

Embodiments of the invention relate to the field of computer networking; and more specifically, to the reduction of resource utilization for Open Shortest Path First (OSPF) Nonstop Routing (NSR) via synchronization reduction.

BACKGROUND

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over a larger geographic area using links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Open Shortest Path First (OSPF) routing protocol described in *Request for Comments (RFC)* 2328, OSPF Version 2, by J. Moy (1998). The OSPF protocol is based on link-state technology and, therefore, is hereinafter referred to as a link state routing protocol.

SUMMARY

The embodiments of the invention include a method of a network element that implements Open Shortest Path First (OSPF) Nonstop Routing (NSR) for intradomain routing. The network element is connected with a neighbor network element over a network connection. The network element executes an active OSPF instance that maintains a link state data base (LSDB) of received links state advertisements (LSAs) and a standby OSPF instance that maintains a backup LSDB of received LSAs. The method reduces resources utilized to synchronize the active OSPF instance with the standby OSPF instance executed by the network element. The method includes receiving a new instance of a link state advertisement (LSA) from the neighbor network element over the network connection. The LSA is added to an on-hold LSA linked list or the LSA is moved to a tail of the on-hold linked list by the active OSPF instance. The LSA is sent to the standby OSPF instance via inter-process communication (IPC) by the active OSPF instance. At the active OSPF instance, an LSA acknowledgement is received for the LSA from the standby OSPF instance. The acknowledged LSA is looked up in the on-hold LSA linked list by the active OSPF instance and the acknowledged LSA and all preceding LSAs in the on-hold LSA linked list are cleared, which reduces a number of LSA acknowledgements needed between the active OSPF instance and the standby OSPF instance to backup the LSDB.

The embodiments of the invention include a method of a network element implementing Open Shortest Path First (OSPF) Nonstop Routing (NSR) for intradomain routing. The network element is connected with a neighbor network element over a network connection. The network element executes an active OSPF instance that maintains a link state data base (LSDB) of received links state advertisements (LSAs) and a standby OSPF instance that maintains a backup LSDB of received LSAs. The method reduces resources utilized to synchronize the active OSPF instance with the standby OSPF instance executed by the network element. The method includes receiving a group of LSAs from the active OSPF instance via inter-process communication (IPC) by the standby OSPF instance. Each LSA in the group of LSAs is added to an in-process LSA linked list by the standby OSPF instance. An LSA acknowledgment is sent by the standby OSPF instance for a last LSA in the group of LSAs received from the active OSPF instance to the active OSPF instance via IPC. This reduces the number of LSA acknowledgements needed between the active OSPF instance and the standby OSPF instance to backup the LSDB.

The embodiments of the invention include a network element that implements Open Shortest Path First (OSPF) Nonstop Routing (NSR) for intradomain routing. The network element is configured to reduce resources utilized to synchronize the active OSPF instance with the standby OSPF instance executed by the network element. The network element includes a network interconnect including an ingress module and egress module, the ingress module configured to receive link state advertisements (LSAs) from neighbor network elements, the egress module configured to transmit LSAs and LSA acknowledgements to the neighbor network elements. The network element also includes a routing processor coupled to the network interconnect. The routing processor is configured to execute the active OSPF instance. The active OSPF instance includes a link state database (LSDB), an on-hold LSA linked list and a link state processing module. The link state processing module processes a new instance of an LSA received from the neighbor network element over the network connection. The link state processing module adds the LSA to the on-hold LSA linked list or moves the LSA to the tail of the on-hold linked list and sends the LSA to the standby OSPF instance via inter-process communication (IPC). The link state processing module receives an LSA acknowledgement of the LSA from the standby OSPF instance and looks up the acknowledged LSA in the on-hold LSA linked list. The link state processing module then clears the acknowledged LSA and all preceding LSAs in the on-hold LSA linked list, which reduces the number of LSA acknowledgements needed between the active OSPF instance and the standby OSPF instance to backup the LSDB.

The embodiments of the invention include another network element that implements Open Shortest Path First (OSPF) Nonstop Routing (NSR) for intradomain routing. The network element is configured to reduce resources utilized to synchronize the active OSPF instance with the standby OSPF instance executed by the network element. The network element includes a network interconnect and a routing processor. The network interconnect includes an ingress module and egress module. The ingress module is configured to receive link state advertisements (LSAs) from neighbor network elements. The egress module is configured to transmit LSAs and LSA acknowledgements to the neighbor network elements. The routing processor is coupled to the network interconnect. The routing processor is configured to execute the standby OSPF instance. The standby OSPF instance includes a backup link state database (LSDB), an in-process LSA linked list and a link state processing module. The link state processing module is configured to receive a group of LSAs from the active OSPF instance via inter-process communication (IPC) and to add each LSA in the group of LSAs to an in-process LSA linked list. The link state processing module is further configured to send an LSA acknowledgment for the last LSA in the group of LSAs received from the active OSPF instance to the active OSPF instance via IPC, which reduces the number of LSA acknowledgements needed between the active OSPF instance and the standby OSPF instance to backup the LSDB.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
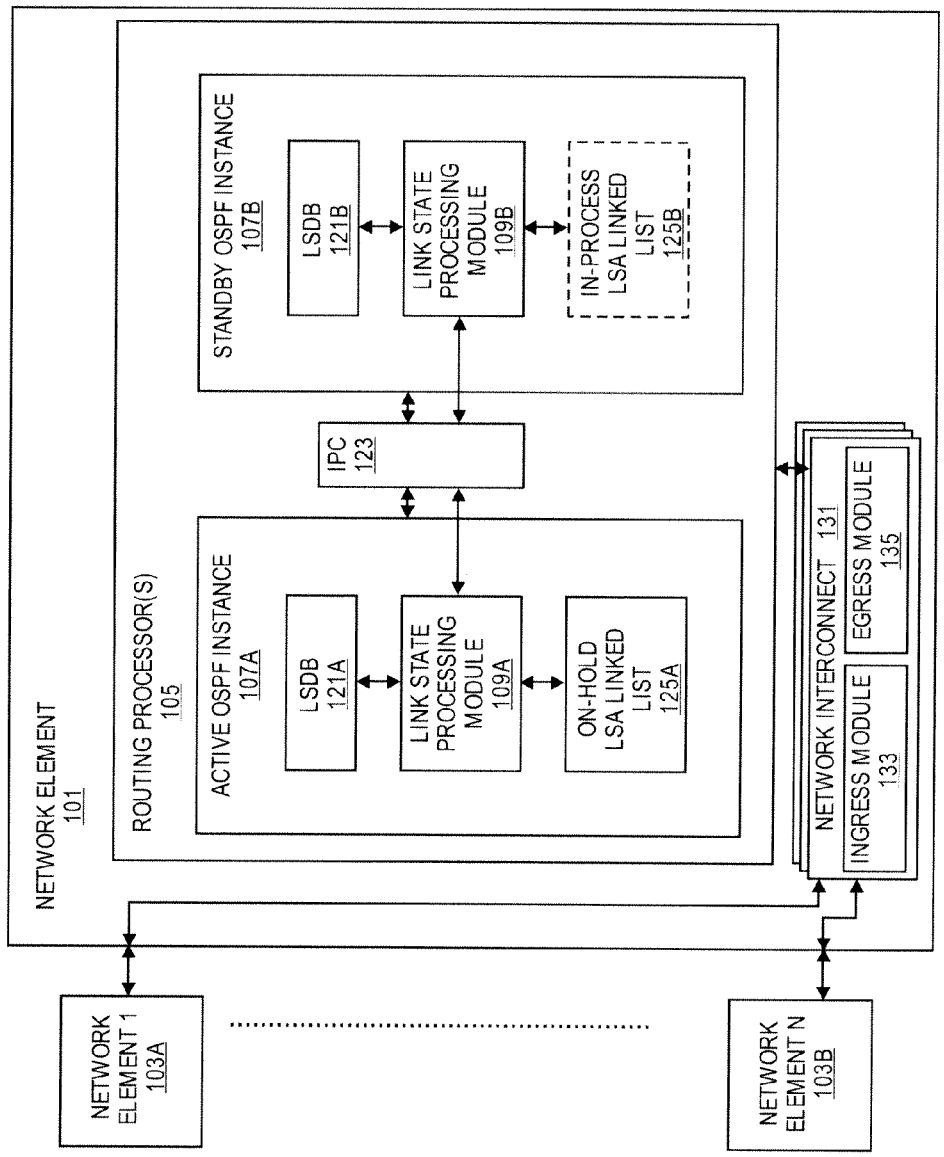
FIG. 1 is a diagram of one embodiment of an exemplary network element and network that implements OSPF Non-stop Routing (NSR) with reduced synchronization costs.

In the following description, numerous specific details are set forth. However, it is understood that embodiments of the invention may be practiced without these specific details. In other instances, well-known circuits, structures and techniques have not been shown in detail in order not to obscure the understanding of the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Every network element implementing OSPF runs a link state routing protocol that maintains an identical link state database (LSDB) describing the topology of the autonomous system (AS) in which it resides. Each individual piece of the LSDB is a particular network element's local state, e.g., the network element's usable interfaces and reachable neighbors or adjacencies. As used herein, neighboring network elements (or "neighbors") are two network elements that have interfaces to a common network, wherein an interface is a connection between a network element and one of its attached networks. Moreover, an adjacency is a relationship formed between selected neighboring network elements for the purpose of exchanging routing information and abstracting the network topology. One or more network element adjacencies may be established over an interface.

The adjacencies are established and maintained through the use of the well-known Hello protocol. Broadly stated, the Hello protocol ensures that communication between neighbors is bi-directional by periodically sending Hello packets out of all of the network element interfaces. Bi-directional communication is indicated when the network element "sees" itself listed in the neighbor's Hello packet. On broadcast and non-broadcast multi-access (NEMA) networks, the Hello protocol elects a designated router (DR) and backup designated router (BDR) for the network, if none exist.

Once a network element establishes an adjacency, it notifies other network elements on the network by sending link state advertisements (LSAs). As used herein the term adjacency indicates an adjacency that has moved beyond the 2-way state (e.g., a Full state) for sake of convenience. These LSAs are distributed through a process called reliable flooding, in which a router forwards an LSA to its neighbor network element(s) and receipt of the LSA is acknowledged by the receiving neighbor network element(s). By way of a specific example, a first network element that originates an LSA forwards that LSA to all of its neighboring network elements. As another example, a first network element that receives a new instance of an LSA from a second network element forwards that LSA to all of its neighboring network elements with the exception of the second network element. The first network element maintains a retransmission list for each network element (neighbor) to which it is in exchange state or above. For each network element to which the LSA has been forwarded, the first network element adds the LSA to the retransmission list associated with that. When the first network element receives an acknowledgment for the LSA from a particular network element, the LSA is removed from that network element's retransmission list. If a network element fails to acknowledge the LSA within a specified time and therefore the LSA remains on that router's retransmission list, the LSA is retransmitted to that network element. This process repeats until the retransmission lists are empty.

For greater reliability, some OSPF implementations use a technique called Nonstop Routing (NSR), in which state is synchronized between an active and standby OSPF instances to assure that a failure of the active OSPF instance and switchover to the standby OSPF instance does not result in any loss of OSPF protocol synchronization. This OSPF synchronization requires that before an acknowledgement to an LSA (LSA Ack) is sent to a neighbor network element from which the LSA was received, the LSA must be processed and acknowledged by the standby OSPF instance to ensure that the state of the standby OSPF instance is synchronized with the active OSPF instance before the acknowledgement is sent to the neighbor network element.

The active OSPF instance can receive duplicate LSAs, and the OSPF protocol mandates that all LSAs need to be acknowledged (using LSA Ack). One example scenario that will cause an active OSPF instance to receive duplicate LSAs is where the active OSPF instance has two neighbors that have identical LSDBs. If the active OSPF instance reboots, it will attempt to establish adjacency with its two neighbors at roughly the same time, sending the same link state requests (LSRs) to each of its neighbors and receiving identical LSAs in response. One copy will arrive first and will be determined to be a new instance (in this case it's in fact brand new) and be flagged and synchronized to the standby. When the second copy is received, an LSA Ack can be immediately sent out if it's already been synchronized to the standby OSPF instance. If the LSA in the LSDB is still flagged, indicating that it's still waiting to be synchronized, then the LSA Ack will be delayed.

State must be synchronized between OSPF instances using Inter-Process Communication (IPC), which is much slower than normal memory access. Hence, the amount of state which is synchronized must be minimized and the number of IPC messages used for synchronization can significantly impact the network element. Each received LSA is separately acknowledged with an LSA acknowledgement message. This acknowledgement process utilizes significant computational resources and IPC memory usage for separately synchronizing each LSA between the active OSPF instance and standby OSPF instance. Each new instance of an LSA must be synchronized from the active OSPF to the standby OSPF instance. The active OSPF flags these LSAs in the LSDB that are waiting to be synchronized to the standby OSPF instance, and then as many of these LSAs as possible are packed into a single IPC message and sent to the standby OSPF instance. For each received LSA, an acknowledgment must be sent from the standby OSPF instance to the active OSPF instance, though several acknowledgments can be packed into a single IPC message and sent to the active OSPF instance. In addition, for each acknowledgment, the active OSPF instance must perform a lookup operation in the link state database (LSDB) to unflag the acknowledged LSA, so that the active OSPF instance can subsequently send an acknowledgment (LSA Ack) to the neighbor network element.

As discussed herein above, a network element (e.g., a router) that implements NSR includes at least two OSPF instances, where a first one acts as an active OSPF instance (or sometimes referred to as a primary OSPF instance) and the second one acts as a standby OSPF instance (or sometimes referred to as a backup OSPF instance or secondary OSPF instance). The active and standby OSPF instances may be executed by routing processors (RPs) on different hardware or the same hardware. For example, one of the OSPF instances may be executed by an RP on a first control card while the other OSPF instance is executed by an RP on a second control card. As another example, the OSPF instances may be executing on different cores of a single processor. As yet another example, the OSPF instances may be running on different processors on the same card. The two OSPF instances must remain synchronized such that if the active OSPF instance fails at any point in time, the standby OSPF instance can be activated and gracefully take over for the failed OSPF instance.

Further, the implementation of the two OSPF instances has reliability, speed, efficiency and error handling. (1) Reliability—the active OSPF instance needs to make sure that its standby OSPF counterpart does receive the information sent by the active OSPF instance. At least the active OSPF instance should be aware of whether the standby OSPF instance gets the data so that it can take appropriate action. A de facto method is that the standby OSPF instance sends acknowledgment (ACK) messages back to the active OSPF instance through inter-process communication (IPC). (2) Speed—the active OSPF instance often is required to put on hold its protocol activities to allow the completion of its database synchronization. One example is that the active OSPF instance delays its LSA acknowledgment to the neighboring network element until it learns that the standby OSPF instance has received the copy of the same LSA. (3) Efficiency—since the database is the largest piece of OSPF data, and the two-way communication between the active OSPF instance and the standby OSPF instance has to cover all the transactions, both the active OSPF instance and the standby OSPF instance will be very busy when the link state database becomes large. When the active OSPF instance receives an acknowledgement (ACK) from the standby OSPF instance, it has to find out which LSA the ACK is for. This invokes the LSA lookup function which is costly and can have an impact on a routing processor's normal functionalities. (4) Error handling—when a configuration changes, or system state changes, or similar cause of error or change occurs, the active OSPF instance and the standby OSPF instance may go out of sync. In particular the active OSPF instance may find that an LSA ACK from the standby OSPF instance does not exist in its database.

The disadvantages of the prior art include performing synchronization for each and every LSA between the active OSPF instance and the standby OSPF instance, it is difficult to maintain the reliabilities without compromising the NSR speed, efficiency, and error handling. And the problem becomes more severe when OSPF is deployed in a sizable network. In fact, the database size does not have to be very large. If a database has about 100,000 routes (where most are redistributed routes), the synchronization can take a few seconds and show an impact on the normal OSPF processes' protocol activities.

The embodiments of the invention overcome these disadvantages of the prior art. The embodiments reduce the volume of the synchronization related messages between the active OSPF instance and the standby OSPF instance and thereby reduce routing processor time devoted to synchronization. The embodiments of the invention reduce the number of LSA lookups by the active OSPF instance. The embodiments of the invention introduce a streamlined LSA synchronization process where the last LSA sent to the standby OSPF instance is used to synchronize an entire LSA stream.

The embodiments of the invention provide a number of advantages including: (1) saving on IPC—by sending one acknowledgement for multiple LSAs, the standby OSPF module saves memory and processor resources in IPC processing; (2) saving on active OSPF resources—the active OSPF reduces the number of LSA lookups that it performs at ratios of dozens or more to one. This is one of the most significant advantages. This effectively makes the NSR synchronization much faster than a regular OSPF process and the NSR resource burden becomes very affordable if not negligible. (3) Error forgiving and auto-correction—the active OSPF instance removes the "on-hold" status of tracked LSAs in a "sweeping" manner. This "sweeping" nature makes the synchronization process error forgiving. If for whatever reason some LSAs fail to be found in a lookup, the subsequent acknowledgement of a subsequent LSA will correct these errors and clear out these widowed LSA entries in the "on-hold" status data structure.

In one example embodiment, an IPC message can carry 40 LSAs. In this example embodiment, the resource saving rate is a ratio of 1 to 40. However, one can group multiple IPC messages and only acknowledge the last LSA of the last IPC message and save resources at an even higher ratio. The embodiments of the invention speed up the synchronization by improving the IPC efficiency as well as the database lookup efficiency. It also improves the error handling. In addition the embodiments of the invention do not compromise the NSR reliability. The lookup reduction is not only good to have, but can be a key differentiator. Without such resource usage improvement the NSR feature can be a drag on the normal OSPF responsiveness and impose a scalability limit.

FIG. 1 is a diagram of one embodiment of an exemplary network element and network that implements OSPF Non-stop Routing (NSR) with reduced synchronization costs. The network includes a network element 101 connected to any number of other network elements 1-N 103A-103B through a set of network interconnect 131. The network element 101 includes a set of routing processors 105 executing the OSPF instances 107A and 107B, where the OSPF instance 107A is currently acting as the active OSPF instance and the OSPF instance 107B is currently acting as the standby OSPF instance in an NSR implementation. A 'set,' as used herein, refers to any positive whole number of items including one item.

Each network interconnect 131 can include an ingress module 133 and an egress module 135. The ingress module 133 handles incoming data traffic at the physical and link level and provides this data to the routing processor 105 for further processing. Similarly, the egress module 135 handles outgoing data traffic at the physical and link level to transmit it to other devices over a connected network link. These two modules function together to enable communication with other devices over a set of networks. The network interconnect 131 can be on the same line card as the routing processor 105 or separate from the routing processor 105, part of the same integrated circuit (IC) or similarly connected with the routing processor 105 within the network element 101.

The network element 101 receives LSAs from its neighboring network elements 103A and 103B. For example, the network element 101 receives LSA(s) from the network element 103A over a link managed by network interconnect 131. The active OSPF instance 107A processes the received LSAs in a link state processing module 109A including storing the information from the LSA into its LSDB 121A. In addition, the active OSPF instance 107A synchronizes the received LSAs with the standby OSPF instance 107B (the standby OSPF instance 107B then stores the information in the LSAs into its LSDB 121B). The network element 101 can also originate LSAs (self-originated LSAs) to transmit to its neighboring network elements, and these LSAs are also synchronized to the standby OSPF instance 107B.

The synchronization between the active OSPF instance 107A and the standby OSPF instance 107B can utilize IPC 123, which operates through a shared memory or similar communication mechanism to provide a single channel of communication between the active OSPF instance 107A and the standby OSPF instance 107B. IPC 123 is a process executed by the routing processor 105. IPC 123 operates as a reliable first in first out (FIFO) communication mechanism.

In addition, the active OSPF instance 107A can maintain an on-hold LSA linked list 125A or similar tracking data structure. Each new instance of an LSA is stored and flagged in the LSDB and placed by the link state processing module 109A in the on-hold LSA linked list 125A at the tail of the linked list and in the order that they are transmitted to the standby OSPF instance 107B. These LSAs can be sent individually or in an ordered group in the form of an IPC 123 message. In one example embodiment, the IPC 123 message can include up to forty LSAs.

The LSAs are also entered into the LSDB 121A prior to or in parallel with the sending of the received LSAs to the standby OSPF instance 107B. The LSAs sent to the standby OSPF instance 107B are also stored in an LSDB 121B. In one embodiment, the standby sends one IPC message to the active OSPF instance acknowledging each received IPC message containing a set of LSAs from the active OSPF instance 107A. The last LSA in each received IPC message is acknowledged. In another embodiment, the received LSAs are added to an in-process LSA linked list 125B. This enables more control over the frequency at which LSA acknowledgements are sent to the active OSPF instance 107A. The LSAs are cleared from the in-process LSA linked list 125B as each corresponding acknowledgement message is sent to the active OSPF instance, where the link state processing module 109B sends the acknowledgement messages via IPC 123. The IPC 123 message includes only an acknowledgement of the last LSA in a group of processed LSAs. This group of LSAs can be defined to have any type or range of boundaries such as a group of LSAs received in a set of IPC messages. For sake of clarity, the embodiment using the in-process LSA linked list 125B is primarily referred to herein. However, one skilled in the art would understand that in-process LSA linked list 125B is optional as well as those operations related to maintaining the in-process LSA linked list 125B.

Upon receipt of the acknowledgement by the link state processing module 109A in the active OSPF instance 107A, the on-hold LSA linked list 125A is then traversed or the identified LSA from the acknowledgement message is used to perform a look up to identify all preceding LSAs that were sent by the active OSPF instance 107A to the standby OSPF instance 107B. All of these preceding LSAs are then unflagged in the LSDB 121A and cleared from the on-hold LSA linked list 125A. By sending only an acknowledgement of the last LSA in a defined group processed by the standby OSPF instance 107B, significant resource usage reduction can be achieved for the synchronization process by avoiding sending and looking up separate acknowledgement messages for each LSA from the standby OSPF instance 107B.

When a switchover occurs, the newly active OSPF instance 107E operates as the active OSPF instance 107A is described herein. For sake of clarity, an example of a functioning active OSPF instance 107A and standby OSPF instance 107B prior to any switchover is described herein. One skilled in the art would understand that the structures and functions described herein can operate to support any number of switchovers between the OSPF instances 107A and 107B.

Figure 2:
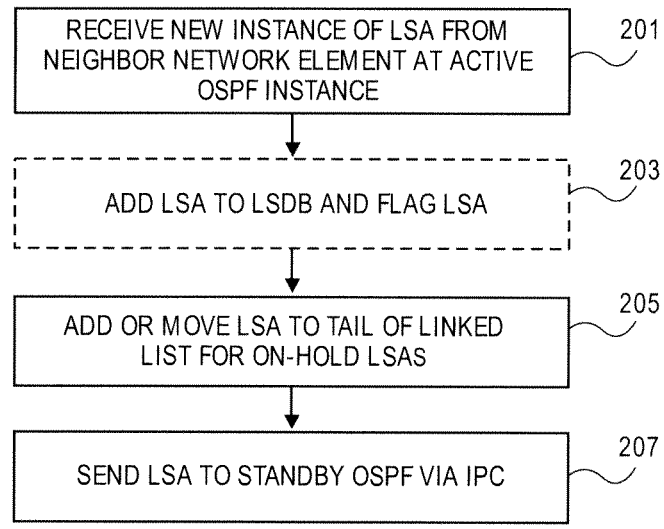
FIG. 2 is a flow diagram of one embodiment of a process of forwarding LSAs by an active OSPF instance to a standby OSPF instance.

FIG. 2 is a flow diagram of one embodiment of a process of forwarding LSAs by an active OSPF instance to a standby OSPF instance. In one embodiment, this process is implemented by a link state processing module in the active OSPF instance executed by the routing processor. The process can be initiated in response to receiving a new instance of an LSA from a neighbor network element at the active OSPF instance (Block 201). A 'new instance,' of an LSA as used herein refers to any new (i.e., not duplicate) LSA whether this LSA is for a link state that has not been previously advertised by the neighbor or is an update of a previously advertised link. The LSA can be added to the LSDB and flagged at this point or in parallel in addition to the on-hold LSA linked list (Block 203).

After or at the time the LSA is flagged in the LSDB it is added to the on-hold LSA linked list or similar data structure such as an array or digest (Block 205). If the LSA that has been received is an update of a previously received, but unacknowledged LSA, that is already in the on-hold LSA linked list, then the LSA is moved from its current position in the linked list to the end of the linked list to ensure that the updated LSA is not cleared by the acknowledgement by the standby OSPF instance of an LSA preceding the updated LSA, but subsequent to the original LSA that corresponds to the updated LSA. An LSA can also be updated when a self-originated LSA is refreshed. A self-originated LSA can be triggered multiple times in a short period of time that does not allow the active OSPF instance to send preceding LSA instances to neighbor network elements.

After the LSA is added to the on-hold LSA linked list or in parallel with the addition to the on-hold LSA linked list, the active OSPF instance sends the LSA to the standby OSPF instance via an IPC message to synchronize the active OSPF instance with the standby OSPF instance (Block 207). The LSA can be sent in a separate IPC message or appended to the end of an IPC message with other LSAs to be synchronized with the standby OSPF instance. The order of the LSAs in the IPC message must be identical to the order of the LSAs in the on-hold LSA linked list at this stage.

Figure 3:
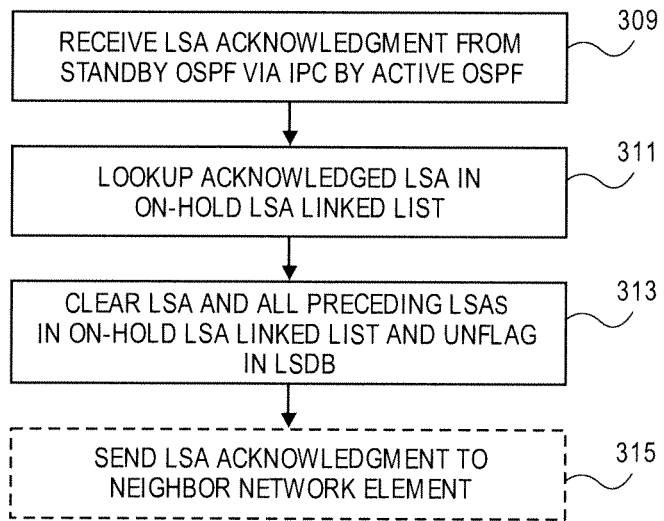
FIG. 3 is a flow diagram of one embodiment of a process of handling acknowledgements by an active OSPF instance that are received from a standby OSPF instance.

FIG. 3 is a flow diagram of one embodiment of a process of handling acknowledgements by an active OSPF instance that are received from a standby OSPF instance. The process is initiated in response to receiving an LSA acknowledgement from the standby OSPF instance (Block 309). The LSA acknowledgement is received by IPC at the active OSPF instance. The IPC message can include a single LSA identifier that explicitly acknowledges the corresponding LSA. The active OSPF instance then performs a lookup of the acknowledged LSA in the on-hold LSA linked list (Block 311). The identified LSA and all preceding LSAs in the on-hold link list are then unflagged in the LSDB and cleared or removed from the on-hold LSA linked list (Block 313). The single LSA acknowledgement thereby provides an inherent acknowledgement for all preceding LSAs, which can also unflag, remove and/or clear any LSAs that were not found during prior LSA acknowledgement lookups. The active OSPF instance can also send the LSA acknowledgements for each of the unflagged, cleared or removed LSAs to the appropriate neighbor network element after the lookup and after the clearing of the LSAs from the on-hold LSA linked list (Block 315). The sending of the LSA acknowledged to the neighbor network element can occur at any time after the clearing of the LSA and preceding LSAs in the on-hold LSA linked list. In this regard, the active OSPF instance maintains a separate list of LSAs that are waiting to be acknowledged (i.e., an LSA Ack list). A timer is associated with each LSA Ack list. When a timer expires, the LSA Ack list is traversed and for each LSA that is unflagged (i.e., not in the on-hold list) an LSA Ack is sent out to the appropriate neighbor network element and the LSA is removed from the LSA Ack list.

Figure 4:
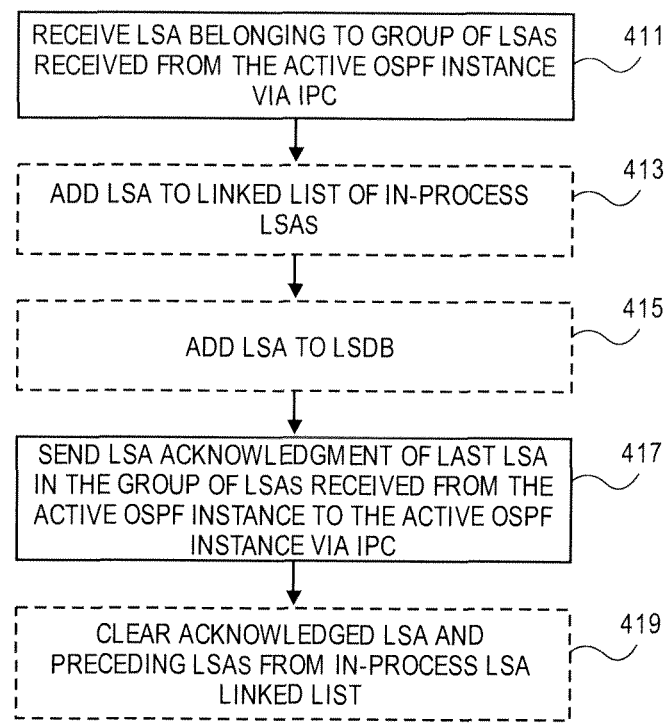
FIG. 4 is a flow diagram of one embodiment of a process of handling LSAs and generating LSA acknowledgements by a standby OSPF instance.

FIG. 4 is a flow diagram of one embodiment of a process of handling LSAs and generating LSA acknowledgements by a standby OSPF instance. The process can be initiated in response to receiving an LSA from the active OSPF instance at the standby OSPF instance (Block 411). The LSA can be received in an IPC message that can have any number of other LSAs in a sequence within the message. This sequence order must be accurately tracked and the LSAs processed in this order. In one embodiment, the incoming IPC message could have as many as forty LSAs. Optionally, each received LSA is added to an in-process LSA linked list (Block 413). The linked list maintains the received sequence order of the LSAs. Each LSA can also be added to the LSDB after being added or in parallel to the addition of the LSA to the in-process LSA linked list (Block 415). In the alternative, an LSA acknowledgement is generated and sent to the active OSPF instance for each received IPC message, where the LSA acknowledgement identifies the last LSA in the received IPC message.

The standby OSPF instance can then send an LSA acknowledgement for the last LSA in a group of processed LSAs to the active OSPF instance via an IPC message (Block 417). The last LSA in the group of processed LSAs is at the tail position in the in-process LSA linked list. The LSA acknowledgement can be sent at set time intervals, on a per IPC message received basis or on a similar timing basis. The timing can be configured to the administrative or system needs and can be dynamically adjusted. For example, during times of high bandwidth usage the frequency of the LSA acknowledgements can be reduced to minimize the resources devoted to the LSA acknowledgement processing for the active OSPF instance. In one embodiment, the timing or frequency of the LSA acknowledgements can be configured by adjusting the group boundaries. Since the last LSA in a group is acknowledged, enlarging the group reduced the frequency of LSA acknowledgements. The boundaries of a group can be defined by a number of LSAs that form a group, a number of IPC messages that form a group or similar group boundary definitions. Once the LSA acknowledgement has been sent, then the corresponding LSA and all preceding LSAs can be cleared or removed from the in-process LSA linked list (Block 419).

Figure 5A:
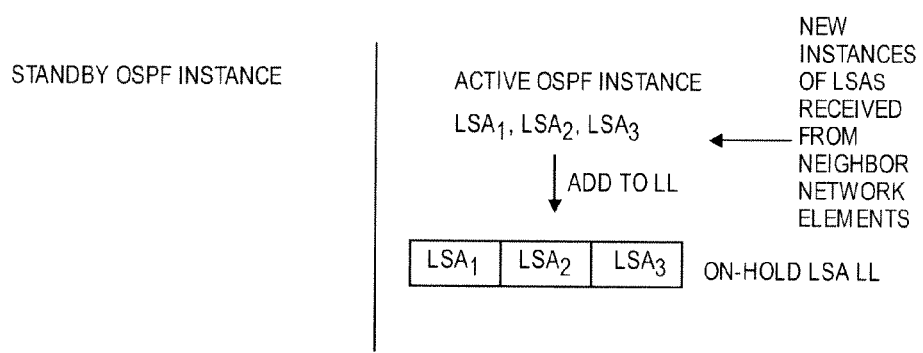
FIGS. 5A-E are diagrams of an exemplary set of operations performed by an active OSPF instance and standby OSPF instance demonstrating the reduced synchronization costs.

FIGS. 5A-E are diagrams of an exemplary set of operations performed by an active OSPF instance and standby OSPF instance demonstrating the reduced synchronization costs. FIG. 5A is a diagram illustrating an example scenario where an active OSPF instance receives a set of new instances of LSAs (LSA1, LSA2 and LSA3) from neighboring network elements. These LSAs can each be from different neighboring network elements or any combination thereof. These LSA are each added to the on-hold LSA linked list (LL) maintained by the active OSPF instance.

Figure 5B:
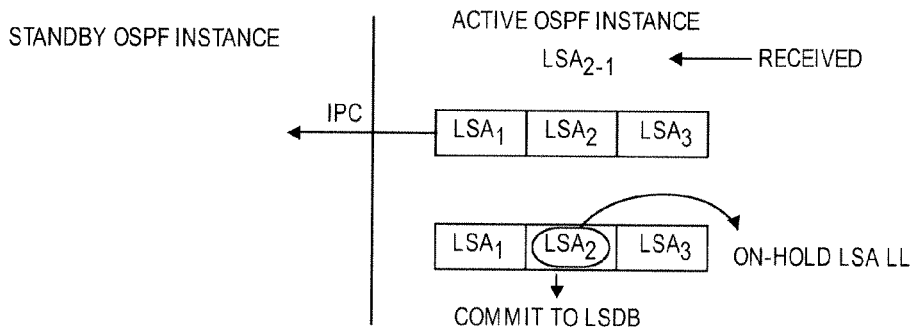

FIG. 5B is a diagram illustrating a subsequent state in the example scenario. The received LSAs (LSA1, LSA2 and LSA3) are sent to the standby OSPF instance for synchronization and added to the LSDB of the active OSPF instance. In addition, in the example scenario a new LSA is received (LSA2-1). The new LSA2-1 is an update of the previously received LSA2. The receipt of the updated LSA2-1 causes the active OSPF instance to move the LSA2 entry in the on-hold LL to the end of the LL.

Figure 5C:
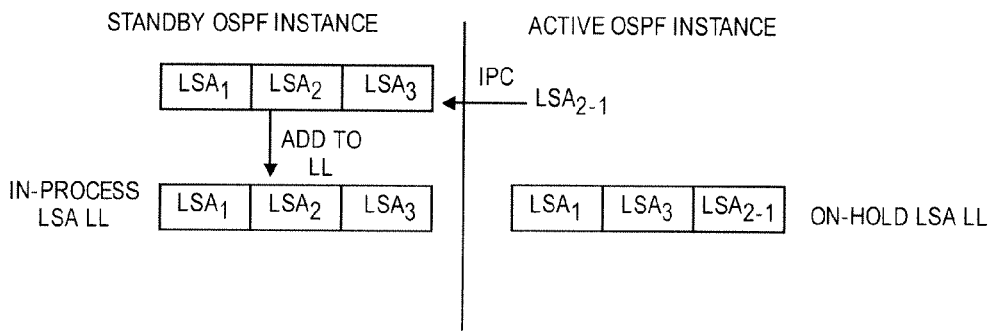

FIG. 5C is a diagram illustrating a subsequent state in the example scenario. The standby OSPF instance adds the received set of LSAs (LSA1, LSA2 and LSA3) to an in-process LL. The active OSPF instance can send the updated LSA2-1 to the standby OSPF instance for synchronization at this point or at any time after this point in the example scenario.

Figure 5D:
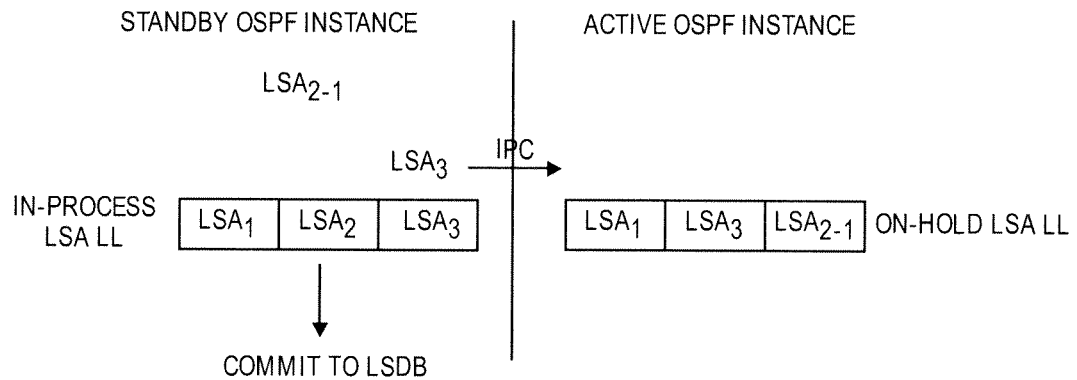

FIG. 5D is a diagram illustrating a subsequent state in the example scenario. The LSAs (LSA1, LSA2 and LSA3) are added to the LSDB by the standby OSPF instance. The standby OSPF instance also generates and sends an LSA acknowledgement for the last LSA in a group of LSAs received from the active OSPF instance, which in the example is LSA3. The acknowledgement can be sent to the active OSPF instance via IPC. At the same time the standby OSPF instance may receive the updated LSA2-1, but has not yet processed it. After or at the time that the acknowledgement for LSA3 is sent to the active OSPF instance, the in-process LL can clear LSA3 and all preceding LSAs in the LL.

Figure 5E:
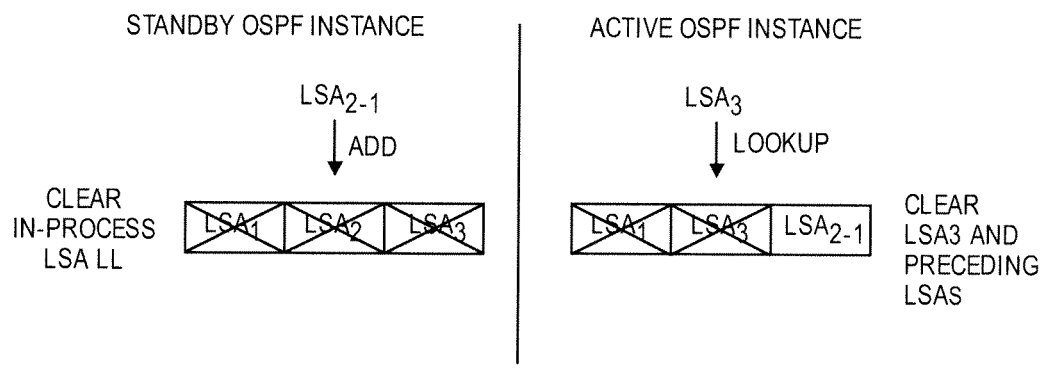

FIG. 5E is a diagram illustrating a subsequent state in the example scenario. The LSA acknowledgement for LSA3 is received and processed at the active OSPF instance. The active OSPF instance looks up the received acknowledged LSA (LSA3). The acknowledged LSA is cleared and all preceding LSAs are cleared. However, in the example, since LSA2 received an update that had not yet been processed and it is in the LL subsequent to LSA3, LSA2 is not cleared. The updated LSA2-1 is then added to the now cleared in-process LL and will be further processed as described above for the original set of LSAs. An LSA update can be any type of change to an LSA that originates from the network element processing the LSA or from the neighbor network element that generated the LSA. Once the LSA acknowledgements have been processed by the active OSPF instance, each cleared LSA is then acknowledged to the corresponding neighbor network element by the active OSPF instance.

Different embodiments of the invention may be implemented using different combinations of software, firmware, and/or hardware. Thus, the techniques shown in the figures can be implemented using code and data stored and executed on one or more electronic devices (e.g. an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network element implementing Open Shortest Path First (OSPF) Nonstop Routing (NSR) for intra-domain routing, wherein the network element is connected with a neighbor network element over a network connection, wherein the network element executes an active OSPF instance that maintains a link state data base (LSDB) of received links state advertisements (LSAs) and a standby OSPF instance that maintains a backup LSDB of received LSAs, the method to reduce resources utilized to synchronize the active OSPF instance with the standby OSPF instance executed by the network element, the method comprising the steps of:
receiving a new instance of a link state advertisement (LSA) from the neighbor network element over the network connection;
adding the LSA to an on-hold LSA linked list or moving the LSA to a tail of the on-hold linked list by the active OSPF instance;

sending the LSA to the standby OSPF instance via inter-process communication (IPC) by the active OSPF instance;

receiving at the active OSPF instance an LSA acknowledgement for the LSA from the standby OSPF instance;

looking up the acknowledged LSA in the on-hold LSA linked list by the active OSPF instance; and clearing the acknowledged LSA and all preceding LSAs in the on-hold LSA linked list, which reduces a number of LSA acknowledgements needed between the active OSPF instance and the standby OSPF instance to backup the LSDB.

2. The method of claim 1, further comprising the steps of: adding the LSA to the LSDB of the active OSPF instance.

3. The method of claim 2, further comprising the steps of: flagging the LSA in the LSDB to indicate the LSA is not synchronized with the backup LSDB of the standby OSPF instance.

4. The method of claim 3, further comprising the steps of: clearing a flag of the LSA upon receipt of the LSA acknowledgement.

5. The method of claim 3, further comprising sending an acknowledgement message for the LSA to the neighbor network element by the active OSPF instance in response to the LSA acknowledgement from the standby OSPF instance.

6. The method of claim 1, wherein sending the LSA to the standby OSPF instance further comprises the steps of:

sending the LSA as a member of a group of LSAs, wherein the LSA is a last LSA in the group.

7. A network element implementing Open Shortest Path First (OSPF) Nonstop Routing (NSR) for intradomain routing, wherein the network element is configured to reduce resources utilized to synchronize the active OSPF instance with the standby OSPF instance executed by the network element, the network element comprising:

a network interconnect including an ingress module and egress module, the ingress module configured to receive link state advertisements (LSAs) from neighbor network elements, the egress module configured to transmit LSAs and LSA acknowledgements to the neighbor network elements; and a routing processor coupled to the network interconnect, the routing processor configured to execute the active OSPF instance, the active OSPF instance including a link state database(LSDB), an on-hold LSA linked list and a link state processing module, the link state processing module to process a new instance of an LSA received from the neighbor network element over the network connection, the link state processing module to add the LSA to the on-hold LSA linked list or to move the LSA to a tail of the on-hold linked list, to send the LSA to the standby OSPF instance via inter-process communication (IPC),to receive an LSA acknowledgement of the LSA from the standby OSPF instance, to look up the acknowledged LSA in the on-hold LSA linked list, and to clear the acknowledged LSA and all preceding LSAs in the on-hold LSA linked list, which reduces a number of LSA acknowledgements needed between the active OSPF instance and the standby OSPF instance to backup the LSDB.

8. The network element of claim 7, wherein the link state processing module is further configured to add the LSA to the LSDB of the active OSPF instance.

9. The network element of claim 7, wherein the link state processing module is further configured to flag the LSA in the LSDB to indicate the LSA is not synchronized with the backup LSDB of the standby OSPF instance.

10. The network element of claim 7, wherein the link state processing module is further configured to clear a flag of the LSA upon receipt of the LSA acknowledgement.

11. The network element of claim 7, wherein the link state processing module is further configured to send an acknowledgement message for the LSA to the neighbor network element by the active OSPF instance in response to the LSA acknowledgement from the standby OSPF instance.

12. The network element of claim 7, wherein the link state processing module is further configured to send the LSA as a member of a group of LSAs, wherein the LSA is a last LSA in the group.

* * * * *